United States Patent
Taguchi

(10) Patent No.: US 6,621,536 B1
(45) Date of Patent: Sep. 16, 2003

(54) MATRIX WIRING SUBSTRATE HAVING AN AUXILIARY LINE CONNECTED TO A BUNDLING LINE

(75) Inventor: Yoshihisa Taguchi, Kawasaki (JP)

(73) Assignee: Fujitsu Display Technologies Corporation, Kawasaki (JP)

(*) Notice: Subject to any disclaimer, the term of this patent is extended or adjusted under 35 U.S.C. 154(b) by 0 days.

(21) Appl. No.: 09/471,347

(22) Filed: Dec. 23, 1999

(30) Foreign Application Priority Data

Dec. 25, 1998 (JP) .......................................... 10-371418

(51) Int. Cl.[7] .......................................... G02F 1/1343
(52) U.S. Cl. .......................................... 349/40; 349/147
(58) Field of Search .......................... 349/40, 42, 147, 349/148, 54; 324/770

(56) References Cited

U.S. PATENT DOCUMENTS

| | | | | |
|---|---|---|---|---|
| 5,019,001 A | * | 5/1991 | Abe et al. ...................... | 216/21 |
| 5,377,030 A | * | 12/1994 | Suzuki et al. ................ | 349/187 |
| 5,532,615 A | * | 7/1996 | Kondo et al. ................ | 324/770 |
| 5,668,032 A | * | 9/1997 | Holmberg et al. ............ | 257/59 |
| 5,796,449 A | * | 8/1998 | Song .......................... | 349/54 |
| 5,825,439 A | * | 10/1998 | Noriyama .................... | 349/54 |
| 5,949,502 A | * | 9/1999 | Matsunaga et al. ........... | 349/40 |
| 6,005,647 A | * | 12/1999 | Lim ............................. | 349/40 |
| 6,100,949 A | * | 8/2000 | Kim ............................. | 349/40 |
| 6,211,076 B1 | * | 4/2001 | Song et al. .................. | 438/665 |
| 6,215,541 B1 | * | 4/2001 | Song et al. .................. | 349/141 |
| 6,310,667 B1 | * | 10/2001 | Nakayoshi et al. ........... | 349/42 |
| 6,429,908 B1 | * | 8/2002 | Lim ............................. | 349/54 |

FOREIGN PATENT DOCUMENTS

| JP | 4 03249624 A | * 11/1991 |
|---|---|---|
| JP | 03-290623 | * 12/1991 |

* cited by examiner

*Primary Examiner*—Kenneth Parker
(74) *Attorney, Agent, or Firm*—Greer, Burns & Crain, Ltd.

(57) ABSTRACT

A plurality of first bus lines extending in a row direction are formed in a first wiring layer above the principal surface of a substrate, and a plurality of second bus lines extending in a column direction are formed in a second wiring layer. Each of the second bus lines crosses each of the first bus lines. In the second wiring layer, a second bundling line extending in the row direction is formed connecting the second bus lines, and in the first wiring layer, a first auxiliary bundling line is disposed along the second bundling line. An interlayer connection member electrically connects the first auxiliary bundling line and second bundling line or second bus lines. Each of the first bus lines is cut near the connection portion to the first bundling line. Each of the second bus lines is cut near the connection portion to the second bundling line.

9 Claims, 6 Drawing Sheets

MATRIX WIRING SUBSTRATE HAVING AN AUXILIARY LINE CONNECTED TO A BUNDLING LINE

This application is based on Japanese Patent Application HEI 10-371418, filed on Dec. 25, 1998, the entire contents of which are incorporated herein by reference.

BACKGROUND OF THE INVENTION a) Field of the Invention

The present invention relates to a matrix wiring substrate and a liquid crystal display substrate, and more particularly to a matrix wiring substrate with bus lines and other lines disposed in the row and column directions, and to a liquid crystal display substrate having such a wiring structure.

b) Description of the Related Art

FIG. 6 is a schematic plane view of a conventional thin film transistor (TFT) substrate of an active matrix type liquid crystal panel. In the image display area of the surface of a glass substrate, a plurality of gate bus lines 1 are disposed extending in the row direction and a plurality of drain bus lines 2 are disposed extending in the column direction. The gate and drain bus lines 1 and 2 are insulated from each other at each cross point by an insulating film.

Although not shown in FIG. 6, near at each cross point between the gate and drain bus lines 1 and 2, a TFT and a pixel electrode are disposed.

In an area other than the image display area of the surface of the glass substrate 19, e.g., in the area along the left side edge shown in FIG. 6, a gate bundling line 15 is disposed extending in the column direction. The gate bundling line 15 is connected to a signal input terminal 28. Each gate bus line 1 is connected at its left end to the gate bundling line 15. The gate bundling line 15, signal input terminal 28 and gate bus lines 1 are formed at the same time by patterning the same conductive film.

In an area other than the image display area of the surface of the glass substrate 19, e.g., in the area along the bottom side edge shown in FIG. 6, a drain bundling line 10 is disposed extending in the row direction. The drain bundling line is connected to a signal input terminal 25. Each drain bus line 2 is connected at its lower end to the drain bundling line 10. The drain bundling line 10, signal input terminal 25 and drain bus lines 2 are formed at the same time by patterning the same conductive film.

A display test is performed by driving all pixels at the same time by applying a TFT control signal to the signal input terminal 28 and an image data signal to the signal input terminal 25.

Before shipping displays, a laser beam is applied to each connection portion between the gate bus line 1 and gate bundling line 15 to disconnect each gate bus line 1 from the gate bundling line 15. In the similar manner, each drain bus line 2 is disconnected from the drain bundling line 10.

Referring to FIG. 6, distances to pixels from the signal input terminal 25 are different. If the electric resistance of the drain bundling line 10 is high, a signal transmission delay at a pixel remote from the signal input terminal 25 becomes large. Therefore, the voltage at the pixel electrode may not rise a desired voltage during the period while each pixel TFT is made conductive by the signal applied to the gate bus line 11. In such a case, an expected brightness of the pixel cannot be obtained.

Similar phenomenon may occur in the case of the gate bundling line 15.

As the signal transmission delay of the gate bundling line 15 becomes large, a gate voltage waveform at a pixel TFT remote from the signal input terminal 28 rises gently. Therefore, a conduction period of TFT may become shorter than an expected period.

If the gate and drain bundling lines 15 and 10 are made thick, the wiring resistance can be reduced. However, as the wiring width is made wider, a large area is occupied by these wiring lines and the integration degree is lowered.

SUMMARY OF THE INVENTION

It is an object of the present invention to provide a matrix wiring substrate capable of reducing the resistance of bundling lines to be formed on the substrate.

According to one aspect of the present invention, there is provided a matrix wiring substrate comprising: a substrate having a principal surface; a plurality of first bus lines formed in a first wiring layer above the principal surface of said substrate and extending in a row direction of the principal surface; a first bundling line formed in the first wiring layer and extending in a column direction of the principal surface, said first bundling line being connected to one end portion of each of said first bus lines; a plurality of second bus lines formed in a second wiring layer different from the first wiring line above the principal surface of said substrate and extending in the column direction of the principal surface, each of said second bus lines crossing each of said first bus lines; a second bundling line formed in the second wiring layer and extending in the row direction of the principal surface, said second bundling line being connected to one end portion of each of said second bus lines; a first insulating film disposed between the first wiring layer and the second wiring layer to electrically insulate the first and second wiring layers; a first auxiliary line formed in the first wiring layer along said second bundling line; and an interlayer connection member for electrically connecting said first auxiliary line to said second bundling line or said second bus lines, wherein each of said first bus lines is cut at a point near a connection portion between each of said first bus lines and said first bundling line, and each of said second bus lines is cut at a point near a connection portion between each of said second bus lines and said second bundling line.

The first auxiliary bundling line is disposed along the second bundling line and both the lines are electrically connected. Therefore, as compared to a second bundling line formed by a single wiring layer, the wiring resistance can be reduced.

As above, the electric resistance can be reduced by forming a bundling line of at least a two-layer structure.

DETAILED DESCRIPTION OF THE PREFERRED EMBODIMENTS

Figure 1:
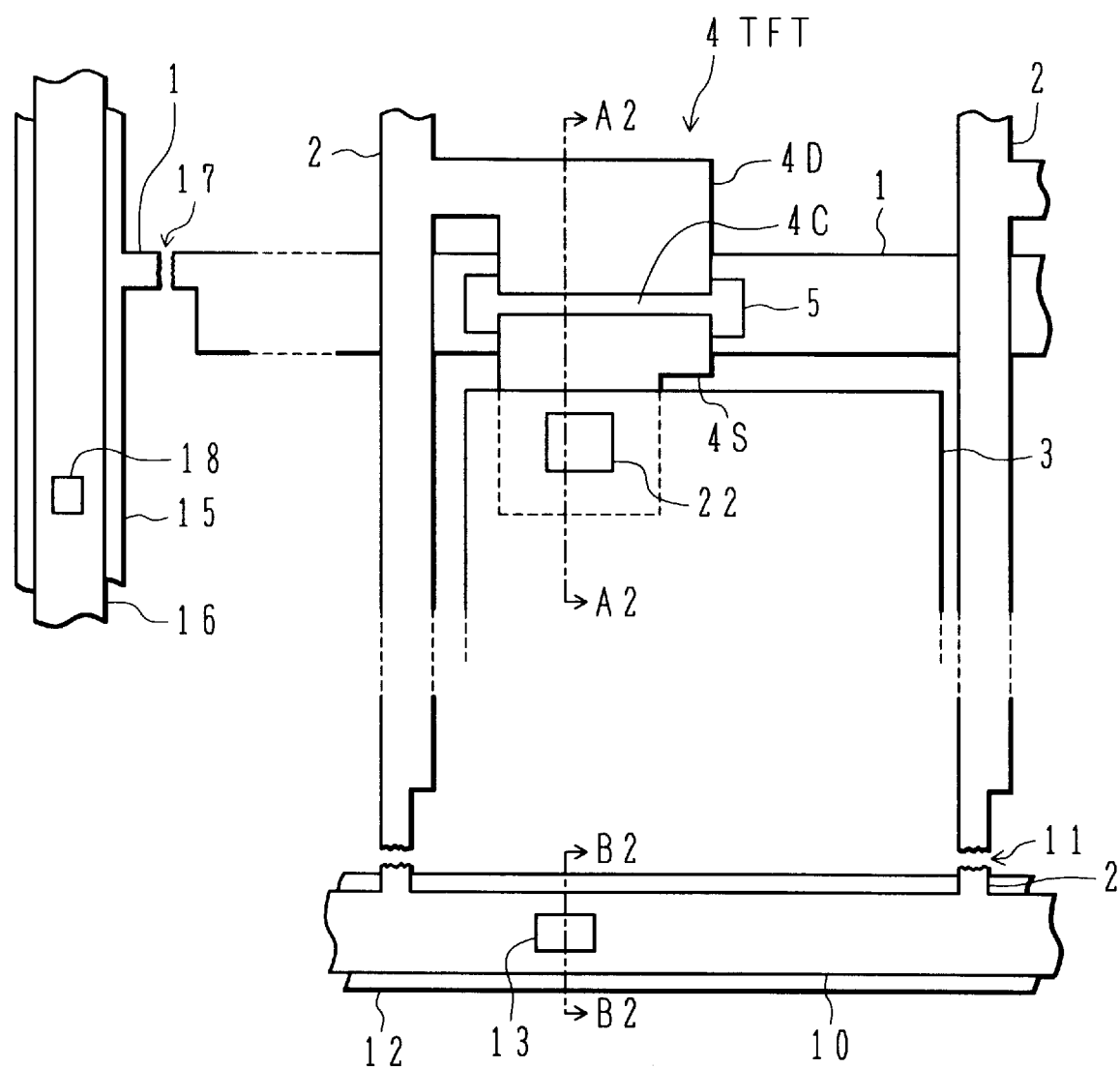
FIG. 1 is a partial plan view of a liquid crystal display substrate according to a first embodiment of the invention.
Figure 6:
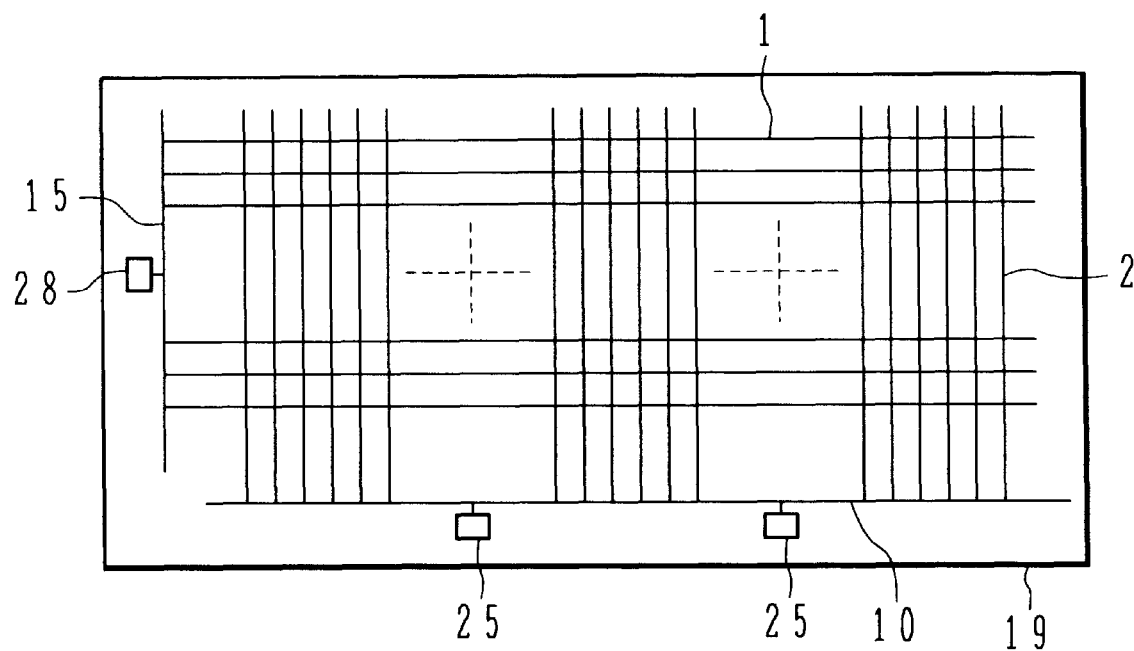
FIG. 6 is a schematic plan view of a liquid crystal display substrate according to the embodiments and a conventional example.

With reference to FIG. 1, a liquid crystal display substrate of the first embodiment will be described. Similar to the conventional substrate, as shown in FIG. 6 the liquid crystal display substrate of the first embodiment has gate bus lines 1, drain bus lines 2, a gate bundling line 15, a drain bundling line 10, and signal input terminals 25 and 28, all being disposed on the surface of a glass substrate 19.

FIG. 1 is a partial plan view of the liquid crystal display substrate according to the first embodiment of the invention. A plurality of gate bus lines 1 extend in the row direction in FIG. 1 and a plurality of drain bus lines 2 extend in the column direction. A pixel electrode 3 is disposed in correspondence with each cross point between the gate and drain bus lines 1 and 2.

Each pixel electrode 3 is connected via a TFT 4 to a corresponding drain bus line 2. The pixel electrode 3 is made of, for example, indium tin oxide (ITO). TFT 4 includes a drain electrode 4D connected to the drain bus line 2, a source electrode 4S connected via a contact hole 22 to the pixel electrode 3, and a channel 4C. The drain and source electrodes 4D and 4S are both made of the same layer of the same material. The active region 4C is made of, for example, amorphous silicon. The gate bus line 1 is also used as the corresponding gate electrode.

A drain bundling line 10 extending in the row direction is disposed in an area outside of the gate bus lines, i.e., in the lowest area as viewed in FIG. 1. The drain bundling line 10 is disposed in the same wiring layer as the drain bus lines 2 and connected to the drain bus lines 2. Each drain bus line 2 is cut at a cut portion 11 near the connection portion between the drain bus line and drain bundling line 10. The cut portion 11 is formed by applying a laser beam to the drain bus line 2 after all pixels are collectively tested. The cut portion 11 near the connection portion is placed between the connection portion and an area where the pixel electrodes are arranged.

An auxiliary drain bundling line 12 is disposed along the drain bundling line 10 in the same wiring layer as the gate bus lines 1. The drain bundling line 10 and auxiliary drain bundling line 12 are electrically connected together at the position of a contact hole 13.

A gate bundling line 15 extending in the column direction is disposed in an area outside of the drain bus lines, i.e., in the leftmost area as viewed in FIG. 1. The gate bundling line 15 is disposed in the same wiring layer as the gate bus lines 1 and connected to the gate bus lines 1. Each gate bus line 1 is cut at a cut portion 17 near the connection portion between the gate bus line and gate bundling line 15. The cut portion 17 is formed by applying a laser beam, similar to the cut portion 11.

An auxiliary gate bundling line 16 is disposed along the gate bundling line 15 in the same wiring layer as the drain bus lines 2. The gate bundling line 15 and auxiliary gate bundling line 16 are electrically connected together at the position of a contact hole 18.

Figure 2A:
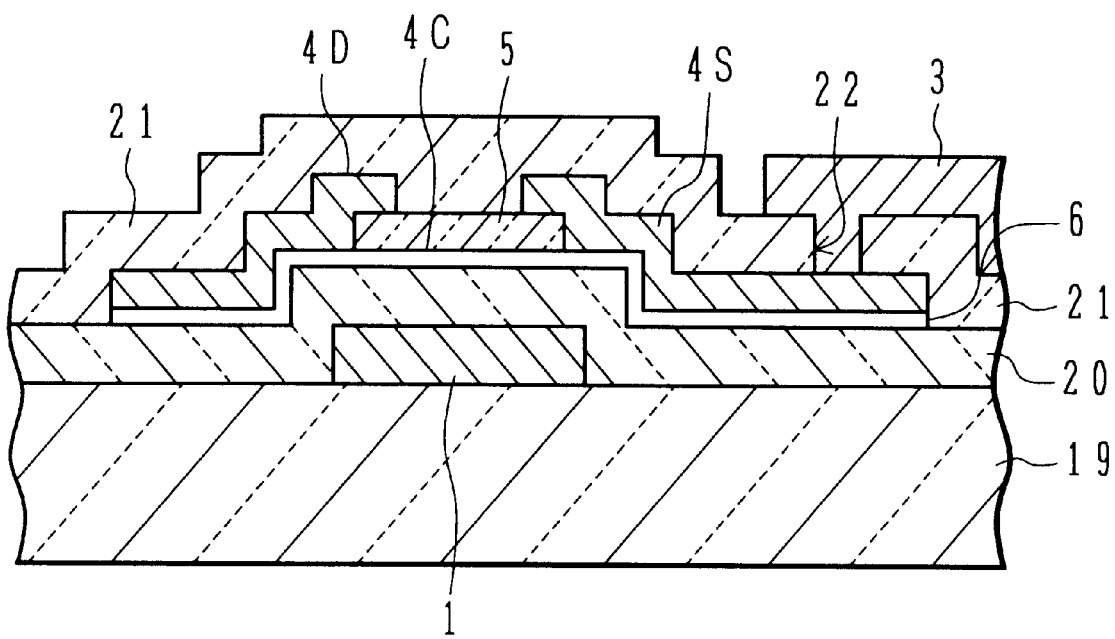
FIGS. 2A and 2B are cross sectional views of the liquid crystal display substrate of the first embodiment.

FIG. 2A is a cross sectional view taken along one-dot chain line A2—A2 shown in FIG. 1. The glass substrate 19 has the gate bus line 1 formed thereon. For example, the gate bus line 1 is formed by forming an Al or Cr film through sputtering and thereafter patterning the Al or Cr film.

The glass substrate 19 is formed thereon with a gate insulating film 20 of SiN having a thickness of about 400 nm and covering the gate bus line 1. For example, the gate insulating film 20 is formed by plasma enhanced chemical vapor deposition (PE-CVD).

The gate insulating film 20 is formed thereon with a non-doped amorphous silicon film 6 having a thickness of 20 nm and striding over the gate bus line 1. A channel protective film 5 of SiN or $SiO_2$ having a thickness of 150 nm is formed on the surface of the amorphous silicon film 6 above the gate bus line 1. The drain and source electrodes 4D and 4S are formed on the surface of the amorphous silicon film 6 on both sides of the channel protective film 5. The drain and source electrodes 4D and 4S each have a stacked-layer structure having an $n^+$-type amorphous silicon layer of 50 nm in thickness and a metal layer of Al or Cr having a thickness of 200 nm.

The processes of forming the structure including those from the amorphous silicon film 6 to the drain and source electrodes 4D and 4S will be described.

First, on the gate insulating film 20, a non-doped amorphous silicon film having a thickness of 20 nm is deposited by PE-CVD. On this amorphous silicon film, an SiN or $SiO_2$ film having a thickness of 150 nm is deposited by PE-CVD. This SiN or $SiO_2$ film is patterned to leave the channel protective film 5.

An $n^+$-type amorphous silicon layer having a thickness of 60 nm is deposited over the whole substrate surface by PE-CVD, covering the channel protective film 5. On this $n^+$-type amorphous silicon layer, a metal layer of Al or Cr having a thickness of 200 nm is formed through sputtering. The $n^+$-type amorphous silicon layer, metal layer and non-doped amorphous silicon layer are patterned to leave the amorphous silicon film 6, drain electrode 4D and source electrode 4S. In this case, the etching stops at the channel protective film 5 so that the channel 4C made of the amorphous silicon layer 6 is left under the channel protective film 5.

A protective insulating film 21 of SiN or $SiO_2$ having a thickness of 400 nm is formed on the gate insulating film 20, covering the drain and source electrodes 4D and 4S and channel protective film 5. The protective insulating film 21 is formed by CVD or sputtering.

On the protective insulating film 21, the pixel electrode 3 of ITO having a thickness of 100 nm is formed. The pixel electrode 3 is connected to the source electrode 4S via a contact hole 22 formed through the protective insulating film 21. The pixel electrode 3 is formed by depositing an ITO film through sputtering and patterning it.

Figure 2B:
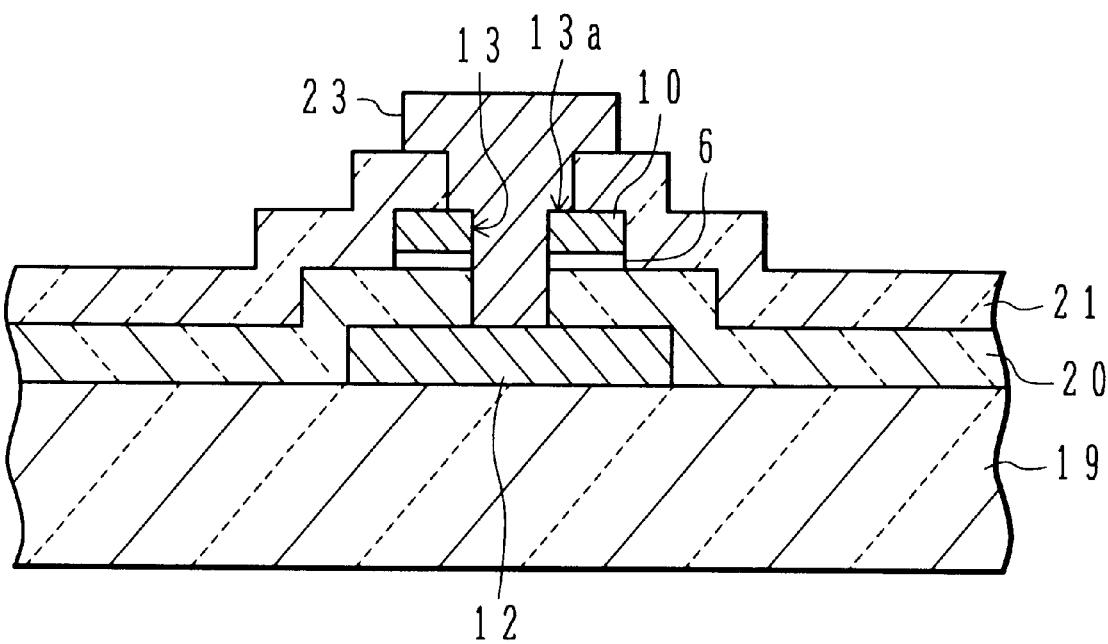

FIG. 2B is a cross sectional view taken along one-dot chain line B2—B2 shown in FIG. 1. The auxiliary drain bundling line 12 is formed on the glass substrate 19. The auxiliary drain bundling line 12 is formed by the same process as the gate bus line 1 shown in FIG. 2A. The glass substrate 19 is formed thereon with the gate insulating film 20 covering the auxiliary drain bundling line 12.

The drain bundling line 10 is formed on the gate insulating film 20 along the auxiliary drain bundling line 12. The drain bundling line 10 is worked to have the pattern shown in FIG. 1. The amorphous silicon film 6 is left under the drain bundling line 10. The amorphous silicon film 6 is formed by the same process as the amorphous silicon film 6 shown in FIG. 2A.

The drain bundling line 10 is formed by the same process as the drain and source electrodes 4D and 4S shown in FIG. 2A. Therefore, the drain bundling line 10 has the stacked-layer structure of the n$^+$-type amorphous silicon layer and the metal layer of Al or Cr. The protective insulating film 21 is formed on the gate insulating film 20, covering the drain bundling line 10.

The contact hole 13 is formed in an area from the upper surface of the protective insulating film 21 to the upper surface of the drain bundling line 12. Of the inner wall of the contact hole 13, an inner wall defined by the sidewall of the protective insulating film is laterally retracted from an inner wall defined by the sidewall of the drain bundling line 10. Therefore, a step 13a is formed on the inner wall of the contact hole 13, being defined by a partial upper surface of the drain bundling line 10.

Of the contact hole 13, a portion thereof extending through the drain bundling line 10 and amorphous silicon film 6 is formed at the same time when the layers of the line 10 and film 6 are patterned as described with reference to FIG. 2A. Of the contact hole 13, a portion thereof extending through the protective insulating film 21 and gate insulating film 20 is formed by the same process as when the contact hole 22 shown in FIG. 2A is formed. Namely, the drain bundling line 10 is used as a mask for etching the gate insulating film 20.

The inside of the contact hole 13 is embedded with a conductive member 23. The conductive member 23 is formed by the same process as the pixel electrode 3 shown in FIG. 2A. Since the step 13a defined by the partial upper surface of the drain bundling line 10 is formed on the inner wall of the contact hole 13, it is possible to electrically stably connect the drain bundling line 10 and auxiliary drain bundling line 12.

The drain bundling line 10 and auxiliary drain bundling line 12 may be connected via two contact holes, one exposing the upper surface of the drain bundling line 10 and the other exposing the upper surface of the auxiliary drain bundling line 12. However, in this case, it is necessary to make the drain bundling line 10 thin in order to obtain the area in which the contact hole exposing the upper surface of the auxiliary drain bundling line 12 is formed.

In the first embodiment, the drain bundling line 10 and auxiliary drain bundling line 12 are connected via one contact hole 13. It is therefore possible to stack the two lines having generally the same width. Since it is not necessary to thin one of the two lines, an increase in electric resistance can be prevented.

Figure 3A:
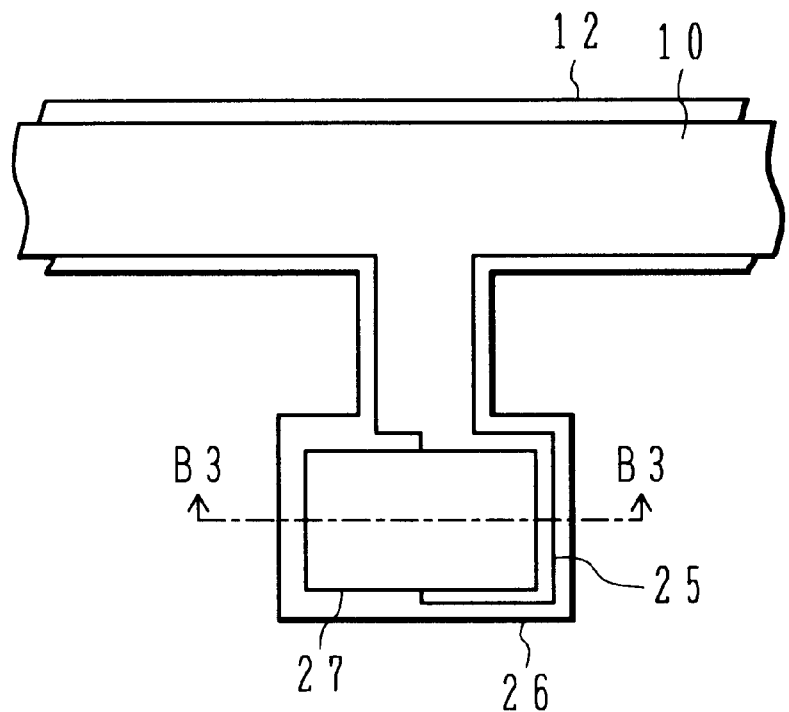
FIGS. 3A and 3B are respectively a plan view and a cross sectional view of a signal input terminal of the liquid crystal display substrate of the first embodiment.

FIG. 3A is a plan view of the signal input terminal 25 from which an external signal is applied to the drain bundling line 10. The signal input terminal 25 extends from the drain bundling line 10 toward the outer periphery of the substrate. It also extends from the auxiliary drain bundling line 12 toward the outer periphery of the substrate. As viewed along the substrate normal, an auxiliary signal input terminal 26 is inclusive of the signal input terminal 25. Namely, the border of the signal input terminal 25 is inside of the auxiliary signal input terminal 26. It is not necessary that the auxiliary signal input terminal 26 is completely inclusive of the signal input terminal 25, but a fraction of the border of the signal input terminal may be configured to be positioned inside of the auxiliary signal input terminal 26.

A conductive member 27 is continuously disposed in an area from the inner area of the signal input terminal 25 to the inner area of the auxiliary signal input terminal 26 which area is the outer area of the signal input terminal 25.

Figure 3B:
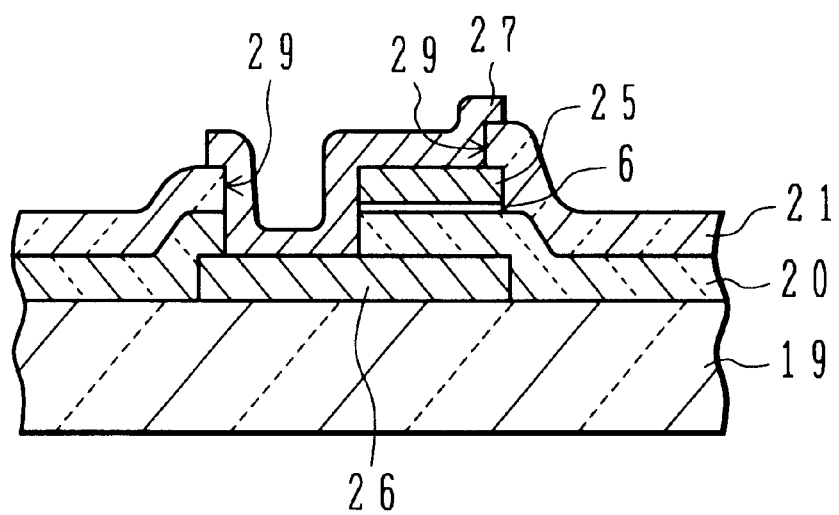

FIG. 3B is a cross sectional view taken along one-dot chain line B3—B3 shown in FIG. 3A. The auxiliary signal input terminal 26 is disposed on the surface of the glass substrate 19. The auxiliary signal input terminal 26 is disposed in the same wiring layer as the gate bus lines 1 shown in FIG. 2A and the auxiliary drain bundling line 12 shown in FIG. 2B, and formed at the same time when the layers of these lines 1 and 2 are formed.

The gate insulating film 20 covers the surfaces of the glass substrate 19 and auxiliary signal input terminal 26. The amorphous silicon film 6 and signal input terminal 25 are sequentially stacked on the gate insulating film 20 in an area above the auxiliary signal input terminal 26. The signal input terminal 25 is disposed in the same wiring layer as the drain and source terminals 4D and 4S shown in FIG. 2A and the drain bundling line 10 shown in FIG. 2B, and formed at the same time when the layers of these terminals and line are formed. The signal input terminal 25 is disposed in about a half plan area of the auxiliary signal input terminal.

The protective insulating film 21 covers the surfaces of the signal input terminal 25 and gate insulating film 20. A contact hole 29 is formed through the protective insulating film 21. On the bottom of the contact hole 29, partial upper surfaces of the auxiliary signal input terminal 26 and signal input terminal 25 are exposed.

The conductive member 27 covers the area from the upper surface and sidewall of the signal input terminal 25, to the sidewall of the gate insulating film 20 and to the upper surface of the auxiliary signal input terminal 26. The conductive member 27 is made of, for example, ITO, and formed by the same process as the conductive member 23 shown in FIG. 2B. The conductive member 27 electrically connects the signal input terminal 25 and auxiliary signal input terminal 26.

In the first embodiment described above, the auxiliary drain bundling line 12 is disposed along the drain bundling line 10 and they are electrically connected at least in two areas. The wiring resistance can therefore be lowered. Since the signal input terminal 25 is electrically connected to the auxiliary signal input terminal 26 at their sites, the resistance of a current path near the signal input point can be efficiently reduced in the total current path from the signal input point to each drain bus line.

The gate bundling line 15 and auxiliary gate bundling line 16 shown in FIG. 1 are connected to terminals similar to the signal input terminal and auxiliary signal input terminal shown in FIG. 3. In this case, the signal input terminal connected to the gate bundling line 15 is disposed under the auxiliary signal input terminal connected to the auxiliary gate bundling line 16.

Next, a sequence of making a liquid crystal display by using the liquid crystal display substrate of the first embodiment will be described.

An opposing substrate is set so as to face the liquid crystal display substrate of the first embodiment at a certain distance. The opposing substrate has a common electrode formed on the opposing surface thereof. Liquid crystal material is filled in between the liquid crystal display substrate and opposing substrate. Predetermined electric signals are applied to the gate bundling line 15 and drain bundling line 10 shown in FIG. 1 to test the display performance. The signals are applied via the signal input terminals shown in FIG. 3A. If the display performance is good, a laser beam is applied to the cut portions 11 and 17 shown in FIG. 1 to cut the drain bus line 2 and gate bus line 1.

Since the electric resistance of the drain and gate bundling lines 10 and is small, it is possible to test the display approximately under the real use conditions.

Figure 4:
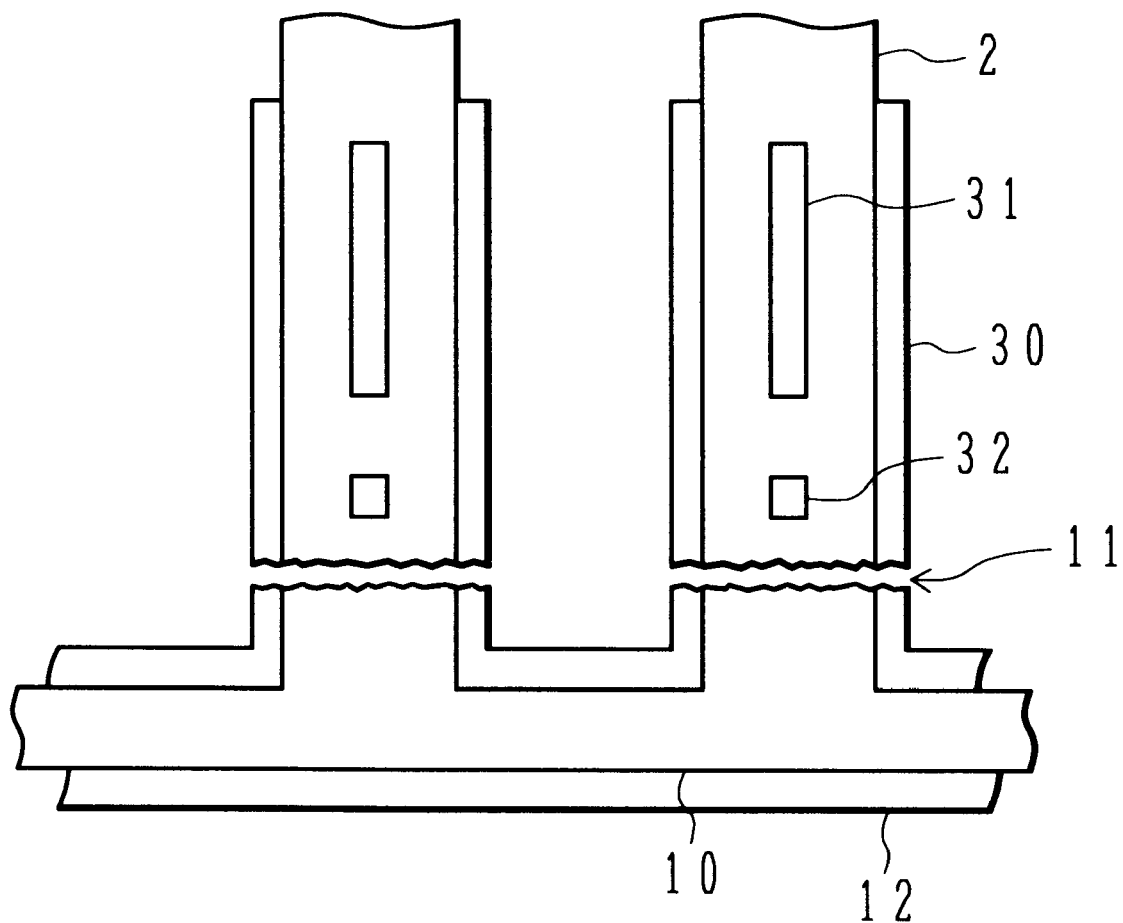
FIG. 4 is a plan view showing connection portions between drain bus lines and a drain bundling line of a liquid crystal display substrate according to a second embodiment of the invention.

FIG. 4 is a plan view showing connection portions between drain bus lines and a drain bundling line of a liquid crystal display substrate of the second embodiment. The structures of the drain bus line 2, drain bundling line 10 and auxiliary drain bundling line 12 are similar to the first embodiment shown in FIG. 1.

In the second embodiment, a plurality of auxiliary branch lines 30 branched from the auxiliary drain bundling line 12 are disposed along the drain bus lines 2. Each auxiliary branch line 30 extends from a cut portion 11 of the drain bus line 2 toward the inner area of the substrate but not in contact with the gate bus line 1 shown in FIG. 1. The auxiliary branch line 30 is later cut at the same position as the cut portion 11 of the drain bus line 2. The auxiliary branch line 11 is cut at the same time when the drain bus line is cut.

Each auxiliary branch line 30 is connected to a corresponding drain bus line 2 via a contact hole 31 disposed at the position more inner than the cut portion 11.

The structure of the contact hole 31 is the same as the contact hole 13 shown in FIG. 2B. A bump 32 is disposed between the cut portion 11 and contact hole 31. Via this bump 32, each drain bus line 2 is connected to an external drive circuit.

In the second embodiment, in the state before the drain bus line 2 is cut at the cut portion 11, the auxiliary drain bundling line 12 is connected to the drain bus line 2 via the auxiliary branch line 30. Therefore, the resistance of a current path near the drain bus line 2 can be efficiently reduced in the total current path from the signal input point to each drain bus line 2.

Even if the electric connection between the drain bus line 2 and auxiliary branch line 30 cannot be achieved by the contact hole 31, this defective electric contact of the contact hole 31 poses no practical problem if sufficient electric connection is achieved by the drain bus line 2 in the nearby area of the contact hole 31.

Figure 5:
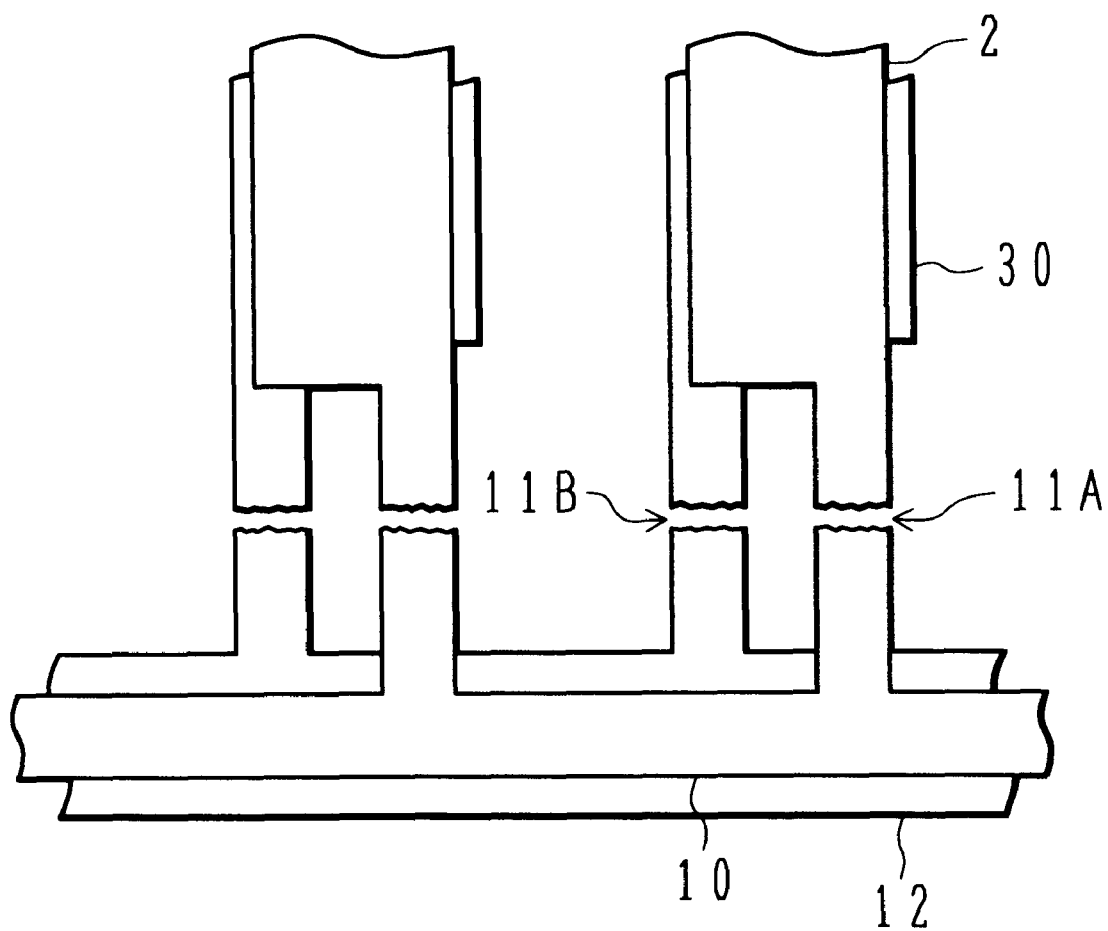
FIG. 5 is a plan view showing connection portions between drain bus lines and a drain bundling line of a liquid crystal display substrate according to a modification of the second embodiment.

FIG. 5 is a plan view showing connection portions between drain bus lines and a drain bundling line of a liquid crystal display substrate according to a modification of the second embodiment. As viewed along the substrate normal, the drain bus line 2 and auxiliary branch line 30 are patterned so as not to make them superpose upon each other in each of cut portions 11A and 11B.

If the drain bus line 2 and auxiliary branch line 30 are superposed one upon the other, there is a possibility that the low wiring layer (drain bus line 2 in the example shown in FIG. 5) is not cut perfectly when both the drain bus line 2 and auxiliary branch line 30 are cut with a laser beam. With this arrangement shown in FIG. 5, cutting failures can be suppressed.

The present invention has been described in connection with the preferred embodiments. The invention is not limited only to the above embodiments. It is apparent that various modifications, improvements, combinations, and the like can be made by those skilled in the art.

What is claimed is:

1. A matrix wiring substrate comprising:

a substrate having a principal surface;

a plurality of first bus lines formed in a first wiring layer above the principal surface of said substrate and extending in a row direction of the principal surface;

a first bundling line formed in the first wiring layer and extending in a column direction of the principal surface, said first bundling line being connected to one end portion of each of said first bus lines;

a plurality of second bus lines formed in a second wiring layer different from the first wiring line above the principal surface of said substrate and extending in the column direction of the principal surface, each of said second bus lines crossing each of said first bus lines;

a second bundling line formed in the second wiring layer and extending in the row direction of the principal surface, said second bundling line being connected to one end portion of each of said second bus lines;

a first insulating film disposed between the first wiring layer and the second wiring layer to electrically insulate the first and second wiring layers;

a first auxiliary line formed in the first wiring layer along said second bundling line; and an interlayer connection member for electrically connecting said first auxiliary line to said second bundling line or said second bus lines, wherein each of said first bus lines is cut at a point near a connection portion between each of said first bus lines and said first bundling line, and each of said second bus lines is cut at a point near a connection portion between each of said second bus lines and said second bundling line, wherein a portion of said first insulating film is disposed between said second bundling line and said first auxiliary line or between said second bus lines and said first auxiliary line, wherein said first auxiliary line overlaps said second bundling line, and wherein the interlayer connection member electrically connects said first auxiliary line and said second bundling line or said first auxiliary line and said second bus lines by penetrating said first insulating film.

2. A matrix wiring substrate according to claim 1, further comprising a second auxiliary line formed in the second wiring layer along said first bundling line and electrically connected to said first bundling line at least at a partial area.

3. A matrix wiring substrate according to claim 1, further comprising:

a second insulating film formed over said first insulating film and covering upper ones of said first and second bus line;

a pixel electrode disposed on said second insulating film at a position corresponding to each cross point between said first and second bus lines; and a switching element for connecting said pixel electrode and one of corresponding first and second bus lines, a conduction state of said switching element being controlled by a signal applied to the other of the corresponding first and second bus lines.

4. A matrix wiring substrate comprising:

a substrate having a principal surface;

a plurality of first bus lines formed in a first wiring layer above the principal surface of said substrate and extending in a row direction of the principal surface;

a first bundling line formed in the first wiring layer and extending in a column direction of the principal surface, said first bundling line being connected to one end portion of each of said first bus lines;

a plurality of second bus lines formed in a second wiring layer different from the first wiring line above the principal surface of said substrate and extending in the column direction of the principal surface, each of said second bus lines crossing each of said first bus lines;

a second bundling line formed in the second wiring layer and extending in the row direction of the principal surface, said second bundling line being connected to one end portion of each of said second bus lines;

a first insulating film disposed between the first wiring layer and the second wiring layer to electrically insulate the first and second wiring layers;

a second insulating film formed over said first insulating film and covering upper ones of said first and second bus line;

a pixel electrode disposed on said second insulating film at a position corresponding to each cross point between said first and second bus lines;

a switching element for connecting said pixel electrode and one of corresponding first and second bus lines, a conduction state of said switching element being controlled by a signal applied to the other of the corresponding first and second bus lines;

a first auxiliary line formed in the first wiring layer along said second bundling line; and an interlayer connection member for electrically connecting said first auxiliary line to said second bundling line or said second bus lines, wherein each of said first bus lines is cut at a point near a connection portion between each of said first bus lines and said first bundling line, and each of said second bus lines is cut at a point near a connection portion between each of said second bus lines and said second bundling line;

wherein said interlayer connection member includes:

a contact hole formed through an upper ones of said first and second bus lines and through said first and second insulating film through said first auxiliary line, said first insulating film and said second insulating film when the first wiring layer is located above the second wiring layer, or formed through said second bundling line or said second bus lines, said first insulating film and said second insulating film, when the second wiring layer is located above the first wiring layer, an inner wall of said contact hole defined by a side wall of the second insulating film being laterally retracted from an inner wall of said contact hole defined by a side wall of the upper ones of said first and second bus lines, said first auxiliary line, said second bundling line or said second bus lines; and a conductive member filled in said contact hole for electrically connecting said first and second bus lines, said first auxiliary line and said second bundling line or said second bus lines.

5. A matrix wiring substrate comprising:

a substrate having a principal surface;

principal a plurality of first bus lines formed in a first wiring layer above the principal surface of said substrate and extending in a row direction of the principal surface;

a first bundling line formed in the first wiring layer and extending in a column direction of the principal surface, said first bundling line being connected to one end portion of each of said first bus lines;

a plurality of second bus lines formed in a second wiring layer different from the first wiring line above the principal surface of said substrate and extending in the column direction of the principal surface, each of said second bus lines crossing each of said first bus lines;

a second bundling line formed in the second wiring layer and extending in the row direction of the principal surface, said second bundling line being connected to one end portion of each of said second bus lines;

a first insulating film disposed between the first wiring layer and the second wiring layer to electrically insulate the first and second wiring layers;

a first auxiliary line formed in the first wiring layer along said second bundling line;

an interlayer connection member for electrically connecting said first auxiliary line to said second bundling line or said second bus lines, a signal input terminal formed in the second wiring layer and connected to said second bundling line; and an auxiliary input terminal formed in the first wiring layer and connected to said first auxiliary line, wherein:

as viewed along a normal to said substrate, a partial border of an upper one of said signal input terminal and said auxiliary signal input terminal is disposed inside of a lower one of said signal input terminal and said auxiliary signal input terminal, and said first insulating film on an upper surface of the lower one not overlapped with the upper one is removed;

the matrix wiring substrate further comprises a conductive member covering an area from an upper surface of the upper one to an upper surface of the lower one via a sidewall of the upper one; and each of said first bus lines is cut at a point near a connection portion between each of said first bus lines and said first bundling line, and each of said second bus lines is cut at a point near a connection portion between each of said second bus lines and said second bundling line.

6. A matrix wiring substrate according to claim 1, further comprising a first auxiliary branch line branched from said first auxiliary line and extending along each of said second bus lines, said first auxiliary branch line having a length not contacting a corresponding one of said first bus lines and being cut near at a branched portion, wherein said interlayer connection member electrically connecting said first auxiliary branch and each of said second bus lines.

7. A matrix wiring substrate according to claim 6, wherein as viewed along a normal to said substrate, a cut position of each of said second bus lines does not superpose upon a cut position of said first auxiliary branch.

8. A liquid crystal display substrate comprising:

a substrate having an image display area defined on a principal surface of said substrate;

a plurality of first bus lines extending in a row direction in the image display area of the principal surface of said substrate;

a first insulating film formed over the principal surface of said substrate and covering said first bus lines;

a plurality of second bus lines extending in a column direction in the image display area above said first insulating film, each of said second bus lines crossing each of aid first bus lines;

a second insulating film formed over said first insulating film and covering said second bus lines;

pixel electrodes disposed on said second insulating film, each of said pixel electrodes arranged in an area corresponding to each cross point between said first and second bus lines;

a switching element for connecting each of said pixel electrodes and one of corresponding first and second bus lines, a conduction state of said switching element being controlled by a signal applied to the other of the corresponding first and second bus lines;

a first wiring line formed in an area other than the image display area of the principal surface of said substrate and disposed between said substrate and said first insulating film; and a second wiring line disposed between said first insulating film and said second insulating film, along said first wiring line and electrically connected to said first wiring line at least in two different areas.

9. A method of manufacturing a liquid crystal display comprising the steps of:

preparing a matrix wiring substrate comprising: a substrate having a principal surface; a plurality of first bus lines formed in a first wiring layer above the principal surface of the substrate and extending in a row direction of the principal surface; a first bundling line formed in the first wiring layer and extending in a column direction of the principal surface, the first bundling line being connected to one end portion of each of the first bus lines; a plurality of second bus lines formed in a second wiring layer different from the first wiring line above the principal surface of the substrate and extending in the column direction of the principal surface, each of the second bus lines crossing each of the first bus lines; a second bundling line formed in the second wiring layer and extending in the row direction of the principal surface, the second bundling line being connected to one end portion of each of the second bus lines; a first insulating film disposed between the first wiring layer and the second wiring layer to electrically insulate the first and second wiring layers; a first auxiliary line formed in the first wiring layer along the second bundling line; an interlayer connection member for electrically connecting the first auxiliary line and the second bundling line or the second bus line; a pixel electrode disposed in an area corresponding to each cross point between the first and second bus lines; and a switching element for connecting the pixel element and one of the corresponding first and second bus lines, a conduction state of the switching element being controlled by a signal applied to the other of the corresponding first and second bus lines; wherein a portion of said first insulating film is disposed between said second bundling line and said first auxiliary line or between said second bus lines and said first auxiliary line, wherein said first auxiliary line overlaps said second bundling line, and wherein the interlayer connection member electrically connects said first auxiliary line and said second bundling line or said first auxiliary line and said second bus lines by penetrating said first insulating film;

making a pre-test liquid crystal display panel comprising an opposing substrate facing the matrix wiring substrate and liquid crystal material in a gap between the matrix wiring substrate and the opposing substrate;

testing a display performance of the pre-test liquid crystal display panel by applying electric signals to the first and second bundling lines;

cutting each of the first bus lines at a point near a connection portion between each of the first bus lines and the first bundling line; and cutting each of the second bus lines at a point near a connection portion between each of the second bus lines and the second bundling line.

* * * * *

UNITED STATES PATENT AND TRADEMARK OFFICE
CERTIFICATE OF CORRECTION

PATENT NO.     : 6,621,536 B1
DATED          : September 16, 2003
INVENTOR(S)    : Taguchi It is certified that error appears in the above-identified patent and that said Letters Patent is hereby corrected as shown below:

<u>Column 9,</u>
Line 57, at the beginning of the paragraph, delete "principal".

Signed and Sealed this

Eleventh Day of May, 2004

JON W. DUDAS
*Acting Director of the United States Patent and Trademark Office*